Patented Mar. 12, 1929.

1,704,909

UNITED STATES PATENT OFFICE.

FRANZ BENCKER, OF COLOGNE-MUHLHEIM, GERMANY, ASSIGNOR TO I. G. FARBEN-INDUSTRIE AKTIENGESELLSCHAFT, OF FRANKFORT-ON-THE-MAIN, GERMANY.

MANUFACTURE OF ALKALI OF HIGH CONCENTRATION.

No Drawing. Application filed February 19, 1926, Serial No. 89,433, and in Germany May 14, 1925.

The process at present employed for the manufacture of caustic alkali by the amalgam method yields, as is well known, only dilute solutions in consequence of the sluggishness of the reaction between the amalgam produced and the water. For the production of concentrated solutions, the solutions thus obtained must be evaporated. To accelerate the reaction of the amalgam and water and thus to obtain directly concentrated solutions was the object of many improvements of the process. Thus, for example, the mercury was brought into contact with other base metals or alloys, or the reaction was accelerated by polarizing the amalgam anodically and also attempts were made to accelerate the reaction of the amalgam with water by means of an addition of nitrates. But notwithstanding the use of these auxiliary devices it was found impossible, to obtain solutions containing more than 50% alkali metal hydroxide.

The present invention concerns the direct manufacture of caustic alkali solutions of 60% strength and above, by working in the presence of aromatic nitro-compounds, whereby the decomposition of the amalgam progresses further in the solutions already produced with the result that solutions of 60% strength and above can be directly obtained, thus obviating the evaporation processes heretofore required. My new process moreover possesses the advantage that the technically important reduction products of the nitro-compounds are simultaneously produced.

The following example will serve to illustrate the invention, it being understood that the process is applicable within very wide limits and that the proportions and the details of working may accordingly be varied, to suit the individual requirements:—

An alkali metal amalgam advantageously produced by an electrolytic process, as for example, sodium amalgam, containing 60 kilos of sodium, is allowed to run into a vessel in which it is caused to react, whilst subjected to brisk stirring, with a suspension in water 100 kg. and an aromatic nitrobody, as for example nitrobenzene 60 kg., care being taken that the suspension should be as intimate as possible.

The temperature is most advantageously maintained at from 80° to 100° for the purpose of the more rapid decomposition of the amalgam. When the reaction is complete the suspension separated and the sodalye obtained is recovered from the reduction product by a simple sedimentation. 165 kilos of a pure soda lye are so obtained, from which on cooling the hydrate 3NaOH.4aq crystallizes out, corresponding to a solution of caustic soda of 62%. The current consumption, or the yield calculated on the sodium is quantitative. When it is intended to produce more dilute solutions it is only necessary to modify the quantity of water which has to be added to the suspension.

The nitro-body used, in the above example nitro-benzene is converted by the hydrogen almost quantitatively into a mixture of azo and hydrazobenzene (44 kilos) which can be further worked up, as is well known.

The process can be carried on continuously.

I claim:—

1. A process for the manufacture of alkali solutions of high concentrations, which comprises the decomposition of an amalgam with water in the presence of an organic nitro compound.

2. A process for the manufacture of alkali solutions of high concentrations, which comprises the decomposition of an amalgam with water in the presence of an aromatic nitro compound.

3. A process for the production of an alkali metal hydroxide solution of high concentration, which comprises treating an alkali metal amalgam with an aqueous solution of an organic nitro compound.

4. A process for the production of a sodium hydroxide solution of high concentration, which comprises treating a sodium amalgam with an aqueous solution of an organic nitro compound.

5. A process according to claim 3, wherein the organic nitro compound comprises an aromatic nitro compound.

6. A process according to claim 3, wherein the organic nitro compound comprises nitrobenzene.

7. A process according to claim 4, wherein the organic nitro compound comprises an aromatic nitro compound.

8. A process according to claim 4, wherein the organic nitro compound comprises nitrobenzene.

9. In a process for preparing sodium hydroxide by treating a sodium amalgam with water, the step which comprises reacting upon the amalgam with water in the presence of sufficient nitrobenzene to cause the formation of a solution containing more than 50% sodium hydroxide, the temperature of said reaction being maintained at from 80° to 100° C.

In testimony whereof I have hereunto set my hand.

FRANZ BENCKER.